United States Patent [19]
Weiss et al.

[11] Patent Number: 5,085,893
[45] Date of Patent: Feb. 4, 1992

[54] PROCESS FOR FORMING A COATING ON A SUBSTRATE USING A SILSESQUIOXANE RESIN

[75] Inventors: Keith D. Weiss; Cecil L. Frye, both of Midland, Mich.

[73] Assignee: Dow Corning Corporation, Midland, Mich.

[21] Appl. No.: 692,871

[22] Filed: Apr. 29, 1991

Related U.S. Application Data

[62] Division of Ser. No. 590,710, Oct. 1, 1990, Pat. No. 5,045,592, Division of Ser. No. 386,450, Jul. 28, 1989, Pat. No. 4,999,397.

[51] Int. Cl.$^5$ .............................................. B08D 3/02
[52] U.S. Cl. ...................................... 427/387; 427/96
[58] Field of Search ................................. 427/387, 96

[56] References Cited

U.S. PATENT DOCUMENTS 4,382,109 5/1983 Olson et al. ........................ 427/387
4,753,855 6/1988 Haluska et al. ...................... 427/38

Primary Examiner—Michael Lusignan
Attorney, Agent, or Firm—Roger E. Gobrogge

[57] ABSTRACT

The present invention provides a relatively simple synthesis procedure for the formation of silane hydrolyzate compositions of the formula $$(RSi(OH)_xO_{\frac{3-x}{2}})_n$$

where R is hydrogen or a methyl group, n is an integer greater than about 8, and x is a number between 0 and 2. The hydrolyzate compositions are metastable in solvent solution, but become insoluble after coating on a substrate. The resins are useful as planarizing coatings for substrates such as electronic devices and can be ceramified by subjecting them to an oxidizing atmosphere at a temperature of between about 100° to 1000° C. to form ceramic or ceramic-like coatings on such substrates.

4 Claims, No Drawings

PROCESS FOR FORMING A COATING ON A SUBSTRATE USING A SILSESQUIOXANE RESIN

This is a divisional of copending application Ser. No. 07/590,710 filed Oct. 1, 1990, now U.S. Pat. No. 5,045,592, which is a divisional of 07/386,450 filed Jul. 28, 1989, now U.S. Pat. No. 4,999,397.

BACKGROUND OF THE INVENTION

This invention relates to metastable silane hydrolyzate solutions and methods for their preparation, and more particularly to the use of such metastable solutions to coat substrates with protective films of insoluble silsesquioxane resins. Such coatings can then be ceramified by heating to form planarizing coatings on substrates.

Condensed hydrogen silsesquioxane resins (HSiO$_{3/2}$)$_n$, particularly those soluble resins having a low molecular weight (i.e., where n>8 but total molecular weight is less than 50,000), are known. Hydrogen silsesquioxane resins have found use as protective coatings applied over metal substrates, as primer coatings to increase adhesion of other sealant coatings to a surface, and as cross-linking agents for silicone elastomer resins. More recently, condensed hydrogen silsesquioxane resins have been proposed as ceramic precursors for planarizing layers on electronic devices. See, for example, Haluska et al, U.S. Pat. Nos. 4,753,855 and 4,756,977.

Early methods for the preparation of hydrogen silsesquioxane in hydrocarbon solvents resulted in a resin which was not fully condensed, i.e. the resin contained residual end blocking hydroxyl or alkoxy groups attached to silicon atoms. Such hydrogen silsesquioxane resins were taught to be susceptible to further condensation to form insoluble gels. See Boldebuck, U.S. Pat. No. 2,901,460, for a discussion of hydrolysis reactions of chlorosilanes.

Collins and Frye, U.S. Pat. No. 3,615,272 and J. Amer. Chem. Soc. 92:19 (1970), reported the synthesis of a fully condensed hydrogen silsesquioxane resin, now known to have contained in the range of 140-330 ppm silanol content, which was soluble in nonpolar organic solvents such as benzene and hexane. The Collins and Frye method added trichloro-, trimethoxy-, or triacetoxysilanes in a hydrocarbon solvent to a two phase reaction medium comprising a concentrated sulfuric acid phase and an aromatic hydrocarbon phase such as benzene, to effect condensation of the silanes.

The fully condensed hydrogen silsesquioxane is recovered by washing the reaction mixture with water until neutral and then evaporating the hydrocarbon solvent. However, the process requires the use of both a corrosive acid and an aromatic hydrocarbon in the synthesis. Further, the resin remains soluble even after coating on a substrate, making it undesirable for planarization building up thicker coatings through multiple applications as each successive coating application will redissolve the previously applied coating unless a catalyst or crosslinking agent is added prior to deposition.

Japanese Kokai Patent No. 60-86017 also reports a process for the preparation of a soluble, fully condensed hydrogen silsesquioxane resin by dissolving a trichlorosilane reactant in a water-saturated organic solvent. The trichlorosilane is hydrolyzed and condensed by bubbling an inert gas and water vapor through the reaction solution. It is taught that care must be taken not to form a separate water phase during the reaction as this results in the formation of an insoluble polycondensed gel product. Consensable silanol (Si—OH) groups are endblocked by the addition of trimethyl chlorosilane as a silylating agent.

Others have reported the formation of siloxane compositions when a chlorosilane starting material is reacted with a metal oxide. For example, Hyde, U.S. Pat. Nos. 2,629,725 and 2,580,852, teaches the reaction of chlorosilanes with metal oxides such as copper, zinc, manganese, and magnesium oxides to form organosiloxanes. The formation of certain cyclic trimers, in the form of substituted cyclotrisiloxanes, by the reaction between chlorosilanes and metal oxides has also been reported. See, Takiguchi et al, J. Org. Chem., 25, 310 (1960) and Wu, U.S. Pat. No. 3,876,677. More recently, Marko et al, U.S. Pat. No. 4,578,494 has taught the reaction of halosilanes in the presence of certain metal oxides and sulfolane to form polysiloxanes.

However, there still remains a need in the art for a relatively simple synthesis procedure which results in the formation of curable silsesquioxane resin solutions and which avoids the use of corrosive acid and/or aromatic hydrocarbon media. Further, the need still exists in the art for silane-containing hydrolyzate which is metastable in solvent solution. Still further, the need exists for a silane-containing hydrolyzates which form an insoluble silsesquioxane resins after coating on a substrate, and which can be repeatedly applied to form relatively thick coatings on substrates.

SUMMARY OF THE INVENTION

The present invention meets that need by providing a relatively simple synthesis procedure for the formation of silane hydrolyzates which form insoluble hydrogen or hydrogen and methyl copolymer silsesquioxane resins upon solvent removal. The hydrolyzates compositions are metastable in solvent solution, but become insoluble after coating on a substrate. The hydrolyzate compositions are described as metastable because relatively small changes in the solvent solution will result in gelling of the hydrolyzate. The resins are useful as planarizing coatings for substrates such as electronic devices and can be ceramified by heating them to form ceramic or ceramic-like coatings on such substrates.

According to one aspect of the present invention, a method for the preparation of a metastable silane hydrolyzate of the formula

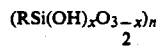

$$(RSi(OH)_xO_{3-x})_n \over 2$$

where R is hydrogen or a methyl group, n is an integer greater than about 8, x is a number between 0 and 2, and the product produced thereby has a silanol content of about 1-10% by weight is provided. For a substantial majority of instances, x will be a number which is less than 1. For example, where x=0.06, the silane hydrolyzate will have a silanol content of about 2%. Where x=0.26, the silane hydrolyzate will have a silanol content of about 8%. Preferably, hydrogen makes up at least 50% of the R groups on the silane hydrolyzate.

The method includes the steps of adding to a water or hydrochloric acid-containing polar organic solvent a chlorosilane of the formula RSiCl$_3$, where R is hydrogen or a methyl group, to form a reaction mixture. At least a substantially stoichiometric amount of a metal oxide is also added to the reaction mixture. The metal oxide acts as a scavenger for hydrogen chloride and as a source of continuous water formation during the reaction.

The reaction is initiated by the addition of an effective amount of either water or hydrochloric acid to the reaction mixture. An effective amount of water or hydrochloric acid is substantially less than a stoichiometric amount (based on moles of chlorosilane reactant), and may be less than 10% of the stoichiometric amount. Additionally, the amount of water or hydrochloric acid present is insufficient to form a separate aqueous phase in the reaction mixture.

Small amounts of hydrochloric acid have been found to initiate the hydrolysis reaction due to the reaction of the metal oxide with the acid to form water and a metal chloride. Preferably, the metal oxide is selected so that an insoluble metal chloride precipitate forms, resulting in easy removal from the hydrolyzate in solution. Washing the hydrolyzate results in a composition having a very low residual chloride content (i.e., less than 500 ppm residual chloride). Once an effective amount of water is present, the chlorosilane then reacts in the reaction mixture to effect hydrolysis and condensation thereof to form the metastable silane hydrolyzate.

In a preferred embodiment, the metal oxide is selected from the group consisting of CuO, ZnO, MgO, CaO, Cu$_2$O, and mixtures thereof. The organic polar solvent is selected for its capability to hydrogen bond with residual silanol groups in the hydrolyzate. The solvent is non-sulfur containing and is an aprotic oxygenated solvent preferably selected from the group consisting of ketones, esters, and mixtures thereof. Specific examples of solvents useful in the practice of the present invention include ethyl acetate, methyl isobutyl ketone, t-butyl acetate, diethyl ether, and mixtures thereof. The concentration of the resulting hydrolyzate in the solvent is preferably maintained at from about 1 to about 25% by weight, with lower concentrations, i.e., concentrations of about 5 weight % or less, having the longest stability in solution.

The process of the present invention produces a composition in which the silanol content of the dissolved hydrolyzate is from about 1-10% by weight, and preferably from about 4-8% by weight. These silanol groups in the hydrolyzate are believed to hydrogen bond with the solvent, accounting for their stability in solution. Subsequent addition of a solvent which is incapable of hydrogen bonding, and/or evaporation of the hydrogen-bonding solvent, causes the hydrolyzate composition to condense to an insoluble product with only 0.2-0.9% silanol content remaining.

Another aspect of the present invention is directed to the metastable silane hydrolyzate solutions in which a non-sulfur containing polar organic solvent contains therein a composition of the formula $$(RSi(OH)_xO_2)_n,$$

where R is hydrogen or a methyl group, n is an integer greater than about 8, x is a number between 0 and 2, and where the silanol content of the composition is from about 1-10% by weight, and preferably about 4-8% by weight. Preferably, the concentration of the hydrolyzate in solution is from about 1 to about 25% by weight. Again, the non-sulfur containing organic polar solvent is selected for its ability to hydrogen bond with the silanol groups in the hydrolyzate, and is preferably selected from the group consisting of ethyl acetate, methyl isobutyl ketone, t-butyl acetate, diethyl ether, and mixtures thereof.

The present invention may be used to form a protective coating of a silsesquioxane resin on a substrate. That process includes the steps of coating the substrate with a solution comprising a non-sulfur containing polar organic solvent containing therein a hydrolyzate composition of the formula $$(RSi(OH)_xO_2)_n,$$

where R is hydrogen or a methyl group, n is an integer greater than about 8, x, is a number between 0 and 2, and where the silanol content of the composition is from about 1-10% by weight, and preferably about 4-8% by weight, and then evaporating the solvent to condense the silanols and thereby deposit an insoluble silsesquioxane resin coating on the substrate which contains about 0.2-0.9% residual silanol groups. The insoluble silsesquioxane resin coating may then be converted to a ceramic or ceramic-like coating by subjecting the coating to an oxidizing atmosphere at a temperature of between about 100° to about 1000° C.

The metastable silane-containing hydrolyzate of the present invention may be applied to a substrate by any of a number of known procedures. For example, the solution containing the hydrolyzate may be coated onto the substrate by spray coating, dip coating, flow coating, or spin coating. Use of the metastable hydrolyzate of the present invention is particularly advantageous for applying planarizing coatings to substrates such as electronic devices as a first layer in a multilayer coating. Because the resin dries to an insoluble coating, a number of thin coating layers may be readily built up.

Accordingly, it is an object of the present invention to provide a relatively simple synthesis procedure for the formation of silane-containing hydrolyzate compositions which are metastable in solvent solution, but become insoluble hydrogen or hydrogen and methyl copolymer silsesquioxane resins after coating on a substrate. This, and other objects and advantages of the present invention, will become apparent from the following detailed description and the appended claims.

DETAILED DESCRIPTION OF THE PREFERRED EMBODIMENTS

The present invention provides a process, and a product resulting therefrom, which is useful in forming insoluble hydrogen and hydrogen and methyl copolymer silsesquioxane resin coatings on substrates. The invention is particularly useful in coating substrates which are susceptible to the adverse effects of moisture and other environmental contaminants such as electronic components and circuitry. The low residual chloride content of the resin (i.e., less than 550 ppm residual chloride is also advantageous). The insoluble silsesquioxane resin coatings made by the process of the present invention make excellent precursors for conversion to silica films as well as provide an adherent base coating for subsequent applications of additional coatings such as passivation and barrier layers to provide complete hermeticity for electronic components and circuitry.

The process of the present invention utilizes as a starting material a chlorosilane of the formula RSiCl$_3$, where R is hydrogen or a methyl group. The chlorosilane starting material is placed in a water or hydrochloric acid-containing polar organic solvent which also contains a substantially stoichiometric amount of a metal oxide is added to the reaction mixture where it is believed to react as follows:

$$RSiCl_3 + H_2O \rightarrow R\text{-Si hydrolyzate} + HCl \quad \text{(Eq. 1)}$$

$$2HCl + MO \rightarrow MCl_2 + H_2O \quad \text{(Eq. 2)}$$

The hydrolyzate which is formed is believed to have the formula $$(RSi(OH)_xO_2)_n,$$

where R is hydrogen or a methyl group, n is an integer greater than about 8, and x is a number between 0 and 2. Where the chlorosilane starting material comprises a mixture of hydrogen and methyl moieties, the resulting hydrolyzate is a copolymer. The ratio of hydrogen to methyl in the copolymer may vary over a broad range. But preferably, the mole ratio of hydrogen to methyl in the copolymer is equal to or greater than one.

As can be seen from Equation 2 above, the metal oxide is believed to react with the hydrochloric acid to form the corresponding metal chloride and water. Accordingly, the presence of either small effective amounts of water or hydrochloric acid will initiate the reaction. The metal oxide utilized may be CuO, ZnO, MgO, CaO, Cu$_2$O, and mixtures thereof. It is not believed that the process of the present invention involves the reaction of a chlorosilane directly with a metal oxide. Rather, it is believed that the metal oxide acts only in the role of a hydrochloric acid scavenger and a controlled regenerator of water. The presence of at least an effective amount of water or hydrochloric acid is believed necessary for the reaction to proceed.

The non-sulfur containing organic polar solvent is selected for its capability to hydrogen bond with residual silanol groups in the hydrolyzate. The solvent is preferably selected from the group consisting of ketones, esters, ethers, and mixtures thereof. Specific examples of suitable solvents include ethyl acetate, methyl isobutyl ketone, t-butyl acetate, diethyl ether, and mixtures thereof. The concentration of the resulting hydrolyzate in the solvent is preferably maintained at from about 1 to about 25% by weight, with lower concentrations, i.e., concentrations of about 5 weight % or less, having the longest stability in solution. Generally, solutions having concentrations of 5 weight % or less can maintain stability on the order of months, while solutions having increasing concentrations of the hydrolyzate may maintain stability on the order of days or hours.

The process of the present invention produces a composition in which the silanol content of the hydrolyzate is from about 1–10% by weight, and preferably about 4–8% by weight. This is in sharp contrast to prior art procedures which produce nearly fully condensed, soluble hydrogen silsesquioxane resins having silanol levels of only about 140–330 parts per million (i.e., from about 0.01 to 0.03% by weight silanol). These silanol groups in the hydrolyzate of the present invention are believed to hydrogen bond with the solvent to give the product its metastability in solution. Subsequent addition of a solvent which is incapable of hydrogen bonding, and/or the evaporation of the hydrogen bonding solvent, causes the hydrolyzate composition to condense to an insoluble product with about a 2000–9000 ppm residual silanol content.

The present invention may be used to form a protective coating of an insoluble silsesquioxane resin on a substrate such as an electronic component or circuit. That process includes the steps of coating the substrate with a solution comprising a non-sulfur containing polar organic solvent containing therein the metastable hydrolyzate composition of the present invention, and then evaporating the solvent, thereby depositing an insoluble silsesquioxane coating on the substrate. The insoluble silsesquioxane coating may then be converted to a ceramic or ceramic-like coating by subjecting the coating to an oxidizing atmosphere at a temperature of between about 100° to about 1000° C.

The metastable silane-containing hydrolyzate of the present invention may be applied to a substrate by any of a number of known procedures. For example, the solution containing the hydrolyzate may be coated onto the substrate by spray coating, dip coating, flow coating, or spin coating. Use of the metastable hydrolyzate of the present invention is particularly advantageous for applying planarizing coatings to substrates such as electronic devices as a first layer in a multilayer coating. Because the resin dries to an insoluble coating, a number of thin coating layers may be readily built up. Additionally, the silsesquioxane resin layer provides an adherent base for additional coatings such as passivation layers and barrier layers.

In order that the invention may be more readily understood, reference is made to the following examples, which are intended to illustrate the invention, but are not to be taken as limiting the scope thereof.

EXAMPLE 1

In order to evaluate the effect of water initially present in the reaction mixture, both the ethyl acetate solvent and the copper (II) oxide were dried prior to use. The ethyl acetate was distilled over phosphorous pentoxide. The copper (II) oxide was placed into a vial under vacuum and heated for several hours. A total of 2.70 g trichlorosilane was added over a one minute period to a rapidly stirred mixture of 2.36 g "dry" CuO in 25 ml "dry" ethyl acetate. No exotherm or color change was observed prior to the addition of water. After approximately 30 minutes, a small amount of water (approximately 0.15 mL) was added to the reaction medium. The reaction proceeded and within 30 minutes, a black/brown solution formed. The clear solution was decanted away from the black/brown CuO/CuCl$_2$ mixture and washed with distilled water. The clear solution was placed into an evaporation dish. A total of 0.54 g (50 percent yield) of insoluble hydrogen silsesquioxane was collected after solvent evaporation. The experiment showed the need for a least an effective amount of water to be present to facilitate the formation of the silane hydrolyzate.

EXAMPLE 2

A total of 1.35 g (0.01 mole) trichlorosilane was added to a rapidly stirred reaction mixture of 1.18 g (0.15 mole) CuO (stoichiometric amount) in 25 mL ethyl acetate containing an effective amount of water to initiate the reaction. No exotherm was observed to take place. However, the black copper (II) oxide was observed to slowly turn green-brown in color indicating the formation of copper (II) chloride. The solution then was filtered and washed several times with distilled water. The solvent was subsequently evaporated to yield 0.14 g (26 percent yield) of an insoluble resin. This resin was shown by infrared spectroscopy to be a form of insoluble hydrogen silsesquioxane that contains some silanol functionality.

The effect of slowly adding the trichlorosilane to the reaction medium and a different stoichiometry was also investigated. A total of 20.2 g (0.15 mole) trichlorosilane in 100 mL of ethyl acetate was added over a 5.0 hour period to a rapidly stirred reaction mixture of 12.0 g (0.15 moles) CuO in 380 mL ethyl acetate. The clear solution was then decanted away from the brown copper (II) chloride and washed several times with distilled water. A total of 400 mL of the solution was stored for future coating investigations. The remaining 80 mL was placed into evaporation dish. A total of 0.57 g (43 percent yield) of an insoluble resin was collected after solvent evaporation. The resin was characterized by infrared spectroscopy to be a form of insoluble hydrogen silsesquioxane that contains some silanol functionality.

EXAMPLE 3

A total of 1.35 g (0.01 mole) of trichlorosilane was added to a rapidly stirred mixture of 1.21 g (0.015 mole) zinc oxide (stoichiometric amount) in 25 mL ethyl acetate containing an effective amount of water resulting in an immediate exotherm. The initially cloudy solution was observed to become clear upon reaction followed by the precipitation of $ZnCl_2$. If the solutions were allowed to stand for any length of time gelation was observed to occur. If gelation had not yet occured, the solution was filtered. An insoluble resin was then collected after solvent evaporation. The insoluble materials obtained either after solvent evaporation or from solution gelation were characterized by infrared spectroscopy as forms of insoluble hydrogen silsesquioxane that contains some silanol functionality.

The above reaction was repeated using 1.82, 0.61 and 0.24 gms of ZnO, as well as stoichiometric amounts of calcium oxide (0.83 g), copper (I) oxide (2.13 g) or magnesium oxide (0.60 g) in place of the zinc oxide. The insoluble resins which resulted were collected and characterized by infrared spectroscopy as forms of insoluble hydrogen silsesquioxane that contains some silanol functionality. The results of the tests are reported in Table I below.

TABLE I

| Metal Oxide | Metal Oxide Weight (g) | HSiCl3 Weight (g) | Weight Ratio MO:HSiCl3 | Results (2% solutions) |
|---|---|---|---|---|
| ZnO | 1.82 | 1.35 | 2.23:1 | immediate gelation |
| ZnO | 1.21 | 1.35 | 1.49:1(s) | gelation after 30 min. |
| ZnO | 0.61 | 1.35 | 0.75:1 | gelation after 24 hrs. |
| ZnO | 0.24 | 1.35 | 0.29:1 | gelation after 24 hrs. |
| CaO | 0.83 | 1.35 | 1.48:1(s) | gelation after 5 min. |
| Cu2O | 2.13 | 1.35 | 1.49:1(s) | gelation after 24 hrs. |
| CuO | 1.18 | 1.35 | 1.49:1(s) | clear solution-stable for greater than 6 months |

(s) equals stoichiometric ratio

EXAMPLE 4

The analytical data obtained for the insoluble hydrogen silsesquioxane resins isolated from the reactions involving trichlorosilane and copper (II) oxide in the above Examples are summarized in Table II below.

TABLE II

| Carbon content | 1.00 percent |
|---|---|
| Hydrogen content | 3.77 percent |
| TGA-weight loss in air | 1.76 percent |
| TGA-weight loss in helium | 3.77 percent |
| GPC-number avg. mol. weight (a) | 848 amu |
| GPC-weight avg. mol. weight (a) | 13,140 amu |
| Proton NMR | 4.90 ppm (s, br) |
| Chlorine content (washed H2O) | 175 ppm |
| Chlorine content (no wash) | 7400 ppm |

(s, br) — broad singlet;
(a) Gel Permeation Chromatography data was obtained by leaching a soluble fraction of the resin with a chlorinated solvent.

The small weight loss of 3.8% observed in the thermogravimetric analysis in the absence of air is indicative of that obtained for a high molecular weight hydrogen silsesquioxane resin. The gel permeation chromatography (GPC) data was obtained on a soluble fraction leached from the dried resin by a chlorinated solvent. Although most of the hydrogen silsesquioxane resin cannot be redissolved in a solvent, the GPC data indicate that a small quantity of low molecular weight extractable species was still present in the resin.

The presence of silanol moieties in the isolated hydrogen silsesquioxane resins was observed by infrared spectroscopy. Attempts to further quantitate the hydroxyl content of these resins included evaluation before and after solvent removal. Prior to solvent removal, the hydrolyzate was found to contain approximately 4-8% by weight silanol moieties. The silanol content in the insoluble films obtained after solvent evaporation was determined by an infrared spectroscopic technique to be in the range of 2000-9000 parts per million (0.2 to 0.9%). This silanol level is much higher than the 140-330 parts per million level previously observed for the nearly fully condensed, soluble hydrogen silsesquioxane resin formed by the method of Collins and Frye, U.S. Pat. No. 3,615,272.

All infrared data were obtained using either a Perkin-Elmer infrared spectrometer, model 783, or a Nicolet FTIR spectrometer, model 5SXB. The chlorine analyses were obtained by neutron activation analysis performed at Dow Chemical Company. All GPC data were obtained using a Hewlett-Packard gas chromatograph, model 5840A, equipped with a capillary inlet system, model 18835B, and a 30 meter DB-17 phenylmethylsilicone fused quartz capillary column (0.32 diameter).

EXAMPLE 5

Hydrocarbon solvents were used to demonstrate their effect on the reaction of trichlorosilane and the subsequent gelation of the silane hydrolyzate when exposed to such hydrocarbon solvents. A total of 5.37 g trichlorosilane was added to a rapidly stirred mixture of 4.74 g CuO in 50 mL ethyl acetate containing an effective amount of water. After the clear solution was decanted away from the metal oxide, it was washed with distilled water. A total of 50 mL of toluene was then added to the clear solution. Immediate clouding of the solution was observed to occur. The solution was again washed with distilled water, filtered and placed into an evaporation dish. A total of 0.11 g (6 percent yield) of insoluble hydrogen silsesquioxane was obtained after solvent evaporation.

In another reaction, a total of 2.70 g trichlorosilane was added to a rapidly stirred reaction medium consisting of 2.36 g CuO in a mixture of 2 mL ethyl acetate and 25 mL toluene containing an effective amount of water. Hydrogen chloride fumes were observed during the water wash procedure prior to gelation of the solution. It is suspected that minimal reaction took place prior to the wash procedure. Similar results were obtained using cyclohexane in place of the toluene and in a zinc oxide/toluene/ethyl acetate reaction medium.

Finally, a total of 1.35 g trichlorosilane was added to a rapidly stirred mixture of 1.21 g zinc oxide in 25 mL ethyl acetate containing an effective amount of water. After the clear solution was decanted away from the metal chloride, a total of 100 mL of toluene was added. Attempts to remove the ethyl acetate under vacuum resulted in gelation of the solution. Similar results were obtained using xylene in place of the toluene.

EXAMPLE 6

The reaction was attempted using a methyl iso-butyl ketone (MIBK) solvent. A total of 2.70 g trichlorosilane was added to a rapidly stirred mixture of 2.36 g CuO in 30 mL of MIBK containing an effective amount of water. The solution was observed to turn orange-brown and a green precipitate formed within several minutes. A mild exotherm was also encountered. The solution was filtered and the filtrate washed 5 times with 100 mL distilled water. The solution became clear in color by the final water wash. A total of 9.5 mL of the clear solution was placed into an evaporation dish. After the solvent had evaporated 0.29 g (86 percent yield) of insoluble hydrogen silsesquioxane was collected. The rest of the clear solution was stored for investigation of stability. The solution was observed to gel within a 24 hour period. The experiment shows the suitability of MIBK as a solvent for the process of the present invention.

EXAMPLE 7

The reaction was attempted using a diethyl ether solvent. A total of 2.70 g trichlorosilane was added to a rapidly stirred mixture of 2.36 g CuO in 30 mL diethyl ether containing an effective amount of water. No color change was noticeable. The clear solution was washed four times with 50 mL distilled mater. During the wash procedure the solution turned from clear to yellow, then to white and finally back to clear. A total of 25 mL of the clear solution was placed into an evaporation dish. After the solvent had evaporated a total of 0.27 g (30 percent yield) insoluble hydrogen silsesquioxane was collected.

EXAMPLE 8

A total of 2.55 g methyltrichlorosilane was added to a rapidly stirred mixture of 2.03 g CuO in 30 mL MIBK containing an effective amount of water. The reaction solution mixture was observed to change color from black to green over a 30 minute period. The mixture was filtered and the filtrate was washed three times with 100 mL distilled water. The clear solution was then placed into an evaporation dish. A total of 0.47 g (52 percent yield) insoluble methyl silsesquioxane resin was collected after solvent evaporation.

EXAMPLE 9

A total of 1.35 g trichlorosilane and 1.28 g methyltrichlorosilane were added to a rapidly stirred mixture of 2.20 g CuO in 30 mL MIBK containing an effective amount of water. After the resulting solution was filtered, the clear filtrate was washed three times with 50 mL distilled water. Then the clear solution was placed into an evaporation dish. After the solvent had evaporated, a total of 0.39 g (40 percent yield) of an insoluble copolymer of $HSiO_{3/2}$—$(H_3C)SiO_{3/2}$ with a methyl-Si:-H—Si ratio of 1:1 was collected demonstrating that the reaction proceeds to form a copolymer.

EXAMPLE 10

Solutions containing a total of 5 weight percent $(H_3C)$ and H—Si hydrolyzates in various ratios were prepared by the addition of trichlorosilane and methyltrichlorosilane mixtures (see Table III) to a rapidly stirred solutions of MIBK (25 mL) containing an effective amount of water. The clear solutions were filtered and then washed three times with 30 mL distilled water. Finally, the clear solutions were stored and periodically checked for stability.

TABLE III

| $H_3CSiCl_3$ (mL) | $HSiCl_3$ (mL) | $H_3CSi:HSi$ | Reaction Results |
|---|---|---|---|
| 1.84 | 0.00 | 1:0 | Solution stable (several months) |
| 1.38 | 0.40 | 3:1 | Solution stable (several months) |
| 0.93 | 1.01 | 1:1 | Gelation after 3 days |
| 0.37 | 1.50 | 1:3 | Gelation after 2 days |
| 0.00 | 2.00 | 0:1 | Gelation after 1 day |

EXAMPLE 11

Potassium bromide discs were coated with several of the hydrolyzate solutions prepared in the above examples. Both methyl and hydrogen silane hydrolyzates in ethyl acetate were used. Additionally, to some of the hydrolyzate solutions, 50 parts per million of tin 2-ethyl hexanoate, nickel iodide, or platinum acetylacetonate catalysts were added. Other samples included no catalysts.

The coated discs were then oxidized in air at 150° C. for one hour. The presence of silanol (Si—OH) moieties could not be determined by infrared spectroscopy in any of the heated samples after one hour. A thermal H—Si redistribution reaction was observed by infrared spectroscopy for both the catalyzed and uncatalyzed reactions. The tests were repeated for other coated discs at 300° C. for one hour. However, the thermal H—Si redistribution reaction could not be observed for samples containing the platinum, nickel, or tin catalysts. Oxidation of the Si-H moieties was observed by infrared spectroscopy to occur within the 150°–300° C. temperature range.

EXAMPLE 12

Several unprotected silicon CMOS devices (Motorola 4011 devices packaged at Norsk Industries) were coated with samples of the hydrogen, methyl, and copolymer silane hydrolyzates prepared in the above examples.

The samples were coated onto the devices using a spin coating procedure at 3000 rpm for a period of 10 seconds. The coated devices were then oxidized in an air atmosphere at 400° C. for one hour.

An 80x magnification of each coated surface showed the coatings to be in excellent condition. These coated devices, along with several uncoated control devices were then exposed to salt spray conditions in accordance with method 1009.4 MIL-STD 883C. The salt spray system used was an Associated Environmental Systems, Model MX-9204.

The coated devices were removed from the salt spray chamber after 10 minutes and then rinsed with purified water. The devices were then heated to 100° C. for 15 minutes to evaporate any remaining water. The devices were then tested on a Teradyne Analytical Circuit Test Instrument, Model J133C. The devices which passed the test were again subjected to the salt spray. This sequence was repeated every two hours until all of the devices failed.

The results, which are reported in Table IV below, show that the hydrolyzates of the present invention provided better protection to the devices than did commercially available spin-on glasses. Also, the hydrolyzates of the present invention performed similarly to fully condensed hydrogen silsesquioxane resin (100-150 ppm platinum catalyst) prepared by the method of Collins and Frye, U.S. Pat. No. 3,615,272.

TABLE IV

| Sample Number | Material (e) | Time to Failure (hr.) (2 devices) |
|---|---|---|
| 7770-50-7 | H—Si hydrolyzate | 7.5 and 11.5 |
| 7770-62-1 | H—Si hydrolyzate | 3.0 and 3.5 |
| 7770-56-6 | methyl-Si hydrolyzate | 5.0 and 7.5 |
| 7770-58-1 | methyl-Si (2.5 wt. percent) and H—Si (2.5 wt. percent) hydrolyzates | 1.0 and 3.5 |
| — | Hydrogen silsesquioxane (condensed) | 8.5 (a) |
| — | Controls (no coatings) | 0.2 and 0.2 |
| Spin-On Glasses | | |
| Accuglas 305 | methylsiloxane SOG | 2.0 (b, c) |
| Accuglas P-172 | phosphosilicate SOG | 2.0 (b, c) |
| Glassclad TF (PS235) | polyethoxyacetoxy silane | 2.0 (b, d) |
| Glassclad SO (PS222) | silane ester | 2.0 (b, d) |

(a) equals average of 12 devices, range equals 4.5-16.0 hours
(b) equals testing of 5 devices
(c) commercially available from Allied Chemical
(d) commercially available from Petrarch Systems, Inc.
(e) The hydrogen silsesquioxane (condensed) sample is the only material that contained a platinum oxidation catalyst (100-150 ppm).

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for the formation of a protective coating of a silsesquioxane resin on a substrate comprising the steps of:
   a) coating said substrate with a solution comprising a non-sulfur containing polar organic solvent containing therein a composition of the formula $(RSi(OH)_xO_{3-x/2})_n$ where R is a hydrogen or a methyl group, provided R is at least 50% hydrogen, n is an integer greater than about 8, and x is a number between 0 and 2, and where the silanol content in said composition is from about 1-10% by weight, and
   b) evaporating said solvent and thereby deposit an insoluble silsesquioxane coating on said substrate.

2. A method for the formation of a ceramic or ceramic-like coating on a substrate comprising the steps of:
   a) coating said substrate with a solution comprising a non-sulfur containing polar organic solvent containing therein a composition of the formula $(RSi(OH)_xO_{3-x/2})_n$ where R is a hydrogen or a methyl group, provided R is at least 50% hydrogen, n is an integer greater than about 8, and x is a number between 0 and 2, and where the silanol content in said composition is from about 1-10% by weight,
   b) evaporating said solvent and thereby deposit an insoluble silsesquioxane coating on said substrate, and
   c) converting said silsesquioxane coating to a silicon dioxide-containing ceramic by subjecting said coating to an oxidizing atmosphere at a temperature of between about 100° to about 1000° C.

3. The method of claim 2 in which said solution containing said composition is coated onto said substrate by spray coating, dip coating, flow coating, or spin coating.

4. The method of claim 2 in which said substrate is an electronic device.

* * * * *